(12) United States Patent
Dr et al.

(10) Patent No.: US 11,964,993 B2
(45) Date of Patent: Apr. 23, 2024

(54) CRYSTALLINE BORTEZOMIB PROCESS

(71) Applicant: SHILPA PHARMA LIFESCIENCES LIMITED, Raichur (IN)

(72) Inventors: Rafiuddin Dr, Raichur (IN); Ananta Naga Kanaka Durga Reddy Guntaka, Raichur (IN)

(73) Assignee: SHILPA PHARMA LIFESCIENCES LIMITED, Karnataka (IN)

( * ) Notice: Subject to any disclaimer, the term of this patent is extended or adjusted under 35 U.S.C. 154(b) by 0 days.

(21) Appl. No.: 17/839,486

(22) Filed: Jun. 14, 2022

(65) Prior Publication Data
US 2023/0002418 A1 Jan. 5, 2023

(30) Foreign Application Priority Data
Jul. 3, 2021 (IN) .............................. 202141029938

(51) Int. Cl.
*C07F 5/02* (2006.01)

(52) U.S. Cl.
CPC .......... *C07F 5/025* (2013.01); *C07B 2200/13* (2013.01)

(58) Field of Classification Search
CPC .............................. C07F 5/025; C07B 2200/13
See application file for complete search history.

(56) References Cited

U.S. PATENT DOCUMENTS

| | | | |
|---|---|---|---|
| 4,525,309 A | 6/1985 | Matteson et al. | |
| 5,780,454 A | 7/1998 | Adams et al. | |
| 7,714,159 B2 | 5/2010 | Pickersgill et al. | |
| 9,217,001 B2 * | 12/2015 | Shrawat | C07D 241/12 |
| 2010/0226597 A1 | 9/2010 | Palle et al. | |

FOREIGN PATENT DOCUMENTS

| | | | |
|---|---|---|---|
| WO | 2008075376 A1 | 6/2008 | |
| WO | 2011099018 A1 | 8/2011 | |
| WO | 2012131707 A2 | 10/2012 | |
| WO | WO-2012131707 A2 * | 10/2012 | ............ C07F 5/025 |

OTHER PUBLICATIONS

Mangin, Organic Process Research & Development, 2009, 13, 1241-1253 (Year: 2009).*

* cited by examiner

*Primary Examiner* — Susanna Moore
*Assistant Examiner* — Luisalberto Gonzalez

(57) ABSTRACT

The present invention relates to a process for the preparation of crystalline Bortezomib of formula (I) and its pharmaceutical acceptable salts thereof.

(I)

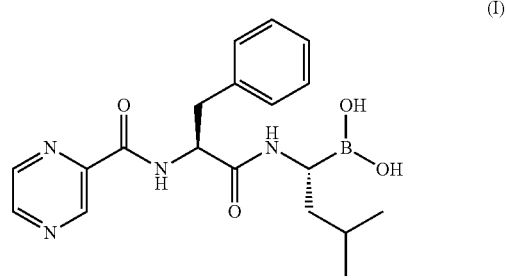

The present invention relates to a process for the preparation of highly pure crystalline Bortezomib (I).

2 Claims, 3 Drawing Sheets

CRYSTALLINE BORTEZOMIB PROCESS

FIELD OF THE INVENTION

The present invention relates to process for the preparation of crystalline Bortezomib of formula (I) and its pharmaceutical acceptable salts thereof.

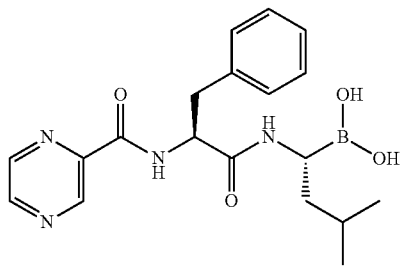

(I)

BACKGROUND OF THE INVENTION

Bortezomib (I) is chemically known as [(1R)-3-methyl-1-[[(2S)-1-oxo-3-phenyl-2-[(pyrazinyl carbonyl)amino] propyl] amino]butyl] boronic acid and is represented by the structural Formula I.

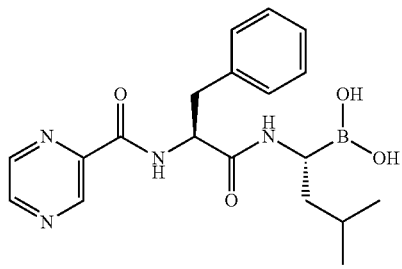

(I)

Bortezomib is a modified di-peptidyl boronic acid and can be represented as an N-protected dipeptide and may be written as Pyz-Phe-boro-Leu, which stands for pyrazinoic acid, phenylalanine and leucine having a boronic acid group in place of carboxylic acid. It is a proteosome inhibitor in organisms and is believed to function as a reversible inhibitor of the chymotrypsin-like activity of the 26S proteasome in mammalian cells. The 26S proteasome is a large protein complex that degrades ubiquitinated proteins. The ubiquitin-proteasome pathway plays a role in regulating the intracellular concentration of specific proteins, maintaining homeostasis within cells. Inhibition of the 26S proteasome prevents this targeted proteolysis, which can affect multiple signaling cascades within the cell. This disruption of normal homeostatic mechanisms can lead to cell death.

Bortezomib is cytotoxic to a variety of cancer cell types in vitro and causes a delay in tumor growth in vivo in nonclinical tumor models, including multiple myeloma. Bortezomib presently is approved in USA for the treatment of multiple myeloma, relapsed multiple myeloma, and mantle cell lymphoma. A variety of combination therapies have been investigated for treating multiple myeloma, in which Bortezomib is administered with one or more other biologically active substances, such as lenalidomide, dexamethasone, melphalan, prednisone, thalidomide, cyclophosphamide, doxorubicin, vincristine, carmustine, pomalidomide, vorinostat, tanespimycin, and perifosine. Other potential uses of bortezomib also have been reported, including treatment of amyloidosis.

It is available in the market under the brand name "VELCADE™" in the form of injection. Each vial contains 3.5 mg of Bortezomib as a sterile lyophilized powder. Chemistry review section of summary basis of approval for Bortezomib (NDA 21-602) mentions that the drug substance, drug product and the reconstituted drug product have three different molecular forms. PS-341 (Bortezomib) drug substance exists as the trimeric boroxine in the solid state. When exposed to water, the boroxine hydrolyses to monomeric boronic acid PS-341. The structure of the lyophilized PS-341 drug product has been determined to be symmetrical mannitol ester. While reconstituted by 0.9% NaCl solution, the reconstituted PS-341 drug product consists of equilibrium between the mannitol ester and the PS-341 boronic acid.

Adams et al in U.S. Pat. No. 5,780,454 discloses Bortezomib, its pharmaceutically acceptable salts, pharmaceutical composition and use in inhibiting the proteosome function in a mammal. Further, it discloses a process for the preparation of Bortezomib and its analogues.

Gupta et al in U.S. Pat. No. 6,713,466 discloses lyophilized formulation of Bortezomib esters. This patent mentions that Bortezomib prepared by the process as described in U.S. Pat. No. 578,054 is white amorphous powder.

U.S. Pat. No. 4,525,309 discloses a process for the homologation of boronic esters by rearrangement of the intermediate boron "ate" complex in the presence of a Lewis acid catalyst to promote the rearrangement reaction and to minimize epimerization of α-carbon atom.

Pickersgill et al in U.S. Pat. No. 7,714,159 disclose processes for preparing Bortezomib and its intermediates which are boronic ester compounds.

US '159 appears to address the problems of the prior art by carrying out the rearrangement of the boron "ate" complex in an ether solvent that has low miscibility with water and a coordinating co-solvent. Non-limiting examples of low water miscible ether solvents identified in the US '159 application for use in the process include tert-butyl methyl ether, tert-butyl ethyl ether, tert-amyl methyl ether, and isopropyl ether.

Further, the US '159 application discloses a process for the preparation of Bortezomib which comprises:
(i) providing a biphasic mixture comprising the intermediate boronic ester compound of formula-IX,

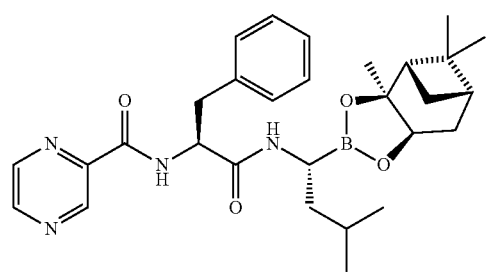

IX an organic boronic acid acceptor, a lower alkanol, a $C_{5-8}$ hydrocarbon solvent, and aqueous mineral acid;
(ii) stirring the biphasic mixture to afford Bortezomib;

(iii) separating the solvent layers; and
(iv) extracting Bortezomib or a boronic acid anhydride thereof into an organic solvent.

To enhance the purity of the product, the aqueous layer obtained after step (iii) is washed to remove neutral organic impurities prior to the extracting step (iv). Such process comprises the following steps:

1) separating the solvent layers;
2) adjusting the aqueous layer to basic pH;
3) washing the aqueous layer with an organic solvent; and
4) adjusting the aqueous layer to a pH of less than about 6.

Thus, the process described in the US '159 comprises multiple organic solvent washings under acidic and basic conditions, followed by extracting the compound into an organic solvent, isolating the product and further recrystallization to obtain Bortezomib of enhanced purity.

It has been found that exposure of Bortezomib to an aqueous basic solution decrease the purity of Bortezomib. Particularly, when such process is performed on a large scale, exposure of Bortezomib to aqueous basic conditions for longer hours is difficult to avoid and hence this process may not be amenable for use on an industrial scale.

WO2008075376A1 discloses crystalline forms I and II of Bortezomib and process for their preparation. Form-I of Bortezomib is prepared by using solvents such as acetone, $CHCl_3$, $CH_2Cl_2$ or nitriles and diluents such as Diisopropyl ether, Tertiary butyl methyl ether, n-hexane and n-heptane. Form-II of Bortezomib is prepared from hot solution of ethyl acetate. The application also discloses that, form-I and form-II are inter convertible by using the above described solvents.

Palle et al in US2010/0226597 disclose a process for the preparation of Bortezomib, its intermediates and process for crystalline forms designated as Forms A and/or B of Bortezomib. Being Bortezomib as an important anticancer therapeutic agent, additional and improved ways of preparing Bortezomib may be of immense value to pharmaceutical science and the healthcare of cancer patients. Hence, there exists a need in the development of new stable Bortezomib form and economically viable processes, which may be commercially up scalable, viable, safer for handling, less time consuming and with better and consistent quality parameters.

The present inventors have found Bortezomib (I) as its stable crystalline form designated as Form-SB and process for preparation thereof.

PCT publication WO 2011/099018 ("the '018 publication") discloses crystalline Form H1 of Bortezomib characterized by XRPD peaks at about 6.8, 13.2, 18.2, 19.1 and 19.5±0.2° 2θ and process for its preparation. The '018 publication further discloses processes for preparation of amorphous Bortezomib.

Ramana Rao et in WO 2012/131707 discloses process for the preparation of crystalline form of Bortezomib, which comprises mixing Bortezomib with water and then slurring the resultant mixture at a temperature of about 0° C. to about 65° C. to get crystalline Bortezomib. Wherein the crystalline form of Bortezomib is characterized by a powder X-ray diffraction pattern having one or more characteristic peaks at about 6.0, 8.5, 12.2, 13.3, 14.1, 17.3, 18.8, 19.0, 19.6, 20.0, 21.6, 22.4, 23.2, 24.2, 24.6, 26.0, 26.8 and 27.3°±0.2° 2θ.

The conversion of one polymorphic form into another polymorphic form can be unfavorable in pharmaceutical dosage forms such as tablets, often resulting in different hygroscopicity, dissolution and pharmacokinetic properties. As a result thereof, the bioavailability of the active agent might be undesirably unpredictable. Consequently, active agents having different interchangeable polymorphs may lead to regulatory and commercial disadvantages since they very often do not fulfill the requirements of the corresponding regulation authorities such as the FDA and EMEA.

In view of the above it is pertinent to note that there exists an inherent need to develop stable crystalline form of Bortezomib and its salts having further improved physical and/or chemical properties besides high purity levels. Hence it was thought worthwhile by the inventors of the present application to explore novel process/crystallization process for the preparation of Bortezomib, which may further improve the characteristics of drug Bortezomib and in developing the substantially pure stable crystalline forms of Bortezomib consistently obtainable and amenable to scale-up.

As polymorphism has been given importance in the recent literatures owing to its relevance to the drugs having oral dosage forms due to its apparent relation to dose preparation/suitability in composition steps/bioavailability and other pharmaceutical profiles, stable polymorphic form of a drug has often remained the clear choice in composition due to various reason of handling, mixing and further processing including bioavailability and stability.

Exploring new polymorphic form for developing stable and pure forms of Bortezomib which are amenable to scale up for pharmaceutically active useful compounds in the preparation of Bortezomib may thus provide an opportunity to improve the drug performance characteristics of products such as purity and solubility. Hence, inventors of the present application report a new polymorphic form, which is a stable and substantially pure form of Bortezomib, which may be industrially amenable and usable for preparing the corresponding pharmaceutical compositions.

In view of above and overcome the prior art problems the present inventors had now developed a new polymorphic form of Bortezomib. It was apparent to develop a process/or crystallization process resulting in the product, which is complying with the ICH requirements of quality parameters. Bortezomib crystalline material was obtained by the process of the present invention is chemically stable and has been found with good dissolution properties.

Therefore, inventors of the present application provide a simple crystalline Bortezomib process which overcomes the disadvantages associated with prior disclosed literature methods.

OBJECTIVE OF THE INVENTION

The main objective of the invention is to provide a process for the preparation of crystalline Bortezomib.

Yet another object of the present invention relates to crystalline forms of Bortezomib, which is stable and which may be industrially amenable and useful for preparing corresponding pharmaceutical compositions.

SUMMARY OF THE INVENTION

The main aspect of the present invention relates to provide a process for preparation of crystalline Bortezomib wherein the process comprises:
a) dissolving bortezomib in a solvent and water mixture;
b) cooling the reaction mixture to −20° C. to −25° C. under stirring;
c) filtering the solid material; and
d) vacuum dried to obtain the crystalline Bortezomib.

Another aspect of the present invention relates to crystalline bortezomib characterized by a powder X-ray diffraction pattern having one or more characteristic peaks at about 6.00, 12.07, 13.25, 18.72, 18.88, 19.13, 21.46, 23.66, 24.07, 24.46 and 25.97±0.2° 2θ designated as Form-SB-I.

Another aspect of the present invention relates crystalline bortezomib Form-SB-I having water content based upon the Loss on drying method by thermo gravimetric analysis (TGA) method in the range between 8 to 10% w/w.

DETAILED DESCRIPTION OF THE INVENTION

Figure 1:
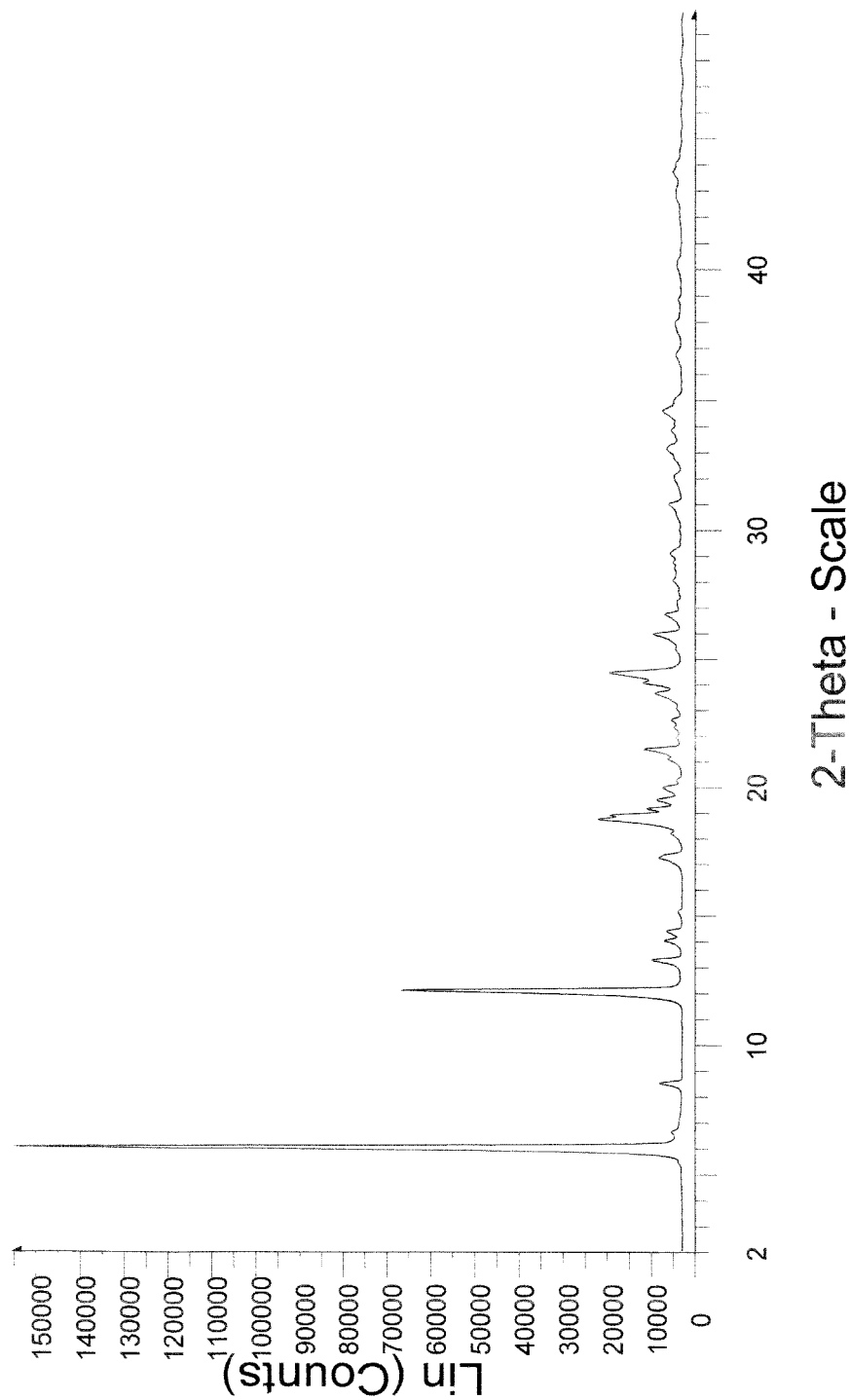
FIG. 1 is an example of X-ray powder diffraction ("XRPD") pattern of crystalline Bortezomib Form-SB-I obtained according the present invention.

The present invention provides a process for the preparation of crystalline bortezomib. Crystal forms of a compound can be distinguished in a laboratory by X-ray diffraction spectroscopy and by other methods such as, infrared spectrometry. Although several polymorphs of Bortezomib had been identified and well known in the literature, each polymorphic form can be distinguished using several different analytical parameters, alone or in combination, such as, but not limited to, powder X-ray diffraction pattern peaks or combinations of two or more peaks. However, the present inventors now developed a new stable crystalline polymorphic form, which are different from the prior-art polymorphic forms disclosed in the literature.

The present invention relates to provide a process for the preparation of crystalline Bortezomib, which is commercially viable and industrially-advantageous process for the preparation of Bortezomib and its pharmaceutically acceptable salts thereof.

The main embodiment of the present invention relates to provide a process for preparation of crystalline Bortezomib wherein the process comprises:
 a) dissolving bortezomib in a solvent and water mixture;
 b) cooling the reaction mixture to −20° C. to −25° C. under stirring;
 c) filtering the solid material; and
 d) vacuum dried to obtain the crystalline Bortezomib.

The starting material bortezomib can be prepared by any known method, for example starting bortezomib may be synthesized as disclosed in U.S. Pat. No. 7,714,159 or by the synthesis disclosed in patent application WO 2014/076713 The starting bortezomib in the slurry may be any crystalline or other form of bortezomib, including various solvates, as long as bortezomib crystalline form is produced during the process of the invention.

The solvent used for the present invention is preferably an ester/alcohol and water mixture. Any form of the Bortezomib used for as a starting material can convert to stable bortezomib crystalline Form-SB-I upon the process of the present invention. Preferably, the ratio of solvent to water is in the range between 20:1 to 10:1 v/v.

The solvent used for the preparation of crystalline Bortezomib Form-SB-I is selected from esters from the group consisting of methyl acetate, ethyl acetate, methyl lactate, ethyl acetoacetate, ethyl butyrate, methyl propionate, isopropyl acetate, butyl acetate, benzyl benzoate, more preferably ethyl acetate; alcohols selected from the group consisting of methanol, ethanol, isopropanol, amyl alcohol, more preferably methanol.

The process involves dissolving Bortezomib in solvent and water mixture may be carried out at ambient temperature, preferably at about 25° C. to 35° C. The reaction mixture is optionally stirred for a period of time needed to achieve the desired transformation, and to get a clear solution. Typically, the stirring time may be from about 5 minutes to 2 hours, preferably about 30 to 60 minutes. The resultant clear solution was cooled to −20° C. to −25° C. under stirring, and continued stirring for 2 hours to 4 hours to achieve crystals of Bortezomib. Filtering the solid material and washed with water at −20° C. to −25° C. The resulting crystalline Bortezomib is dried under vacuum to obtain highly pure crystalline Bortezomib Form-SB-I.

Drying can be suitably carried out in a tray dryer, vacuum oven, air oven, fluidized bed dried, spin flash dryer, flash dryer, suck dryer and the like. The drying can be carried out at a temperature ranging from about 30° C. to 50° C. over the period of about 5 hours to about 15 hours, preferably drying can be carried out at temperature of about 30° C. to 35° C. over the period of about 15 hours.

The process related impurities, including unreacted intermediates, side products, degradation products and other medium dependent impurities, that appears in the impurity profile of the Bortezomib can substantially be removed by the process of the present invention resulting in the formation of crystalline Bortezomib Form-SB-I. A substantially pure product having purities more than 99.5% (by HPLC) can be obtained by the process of the present invention.

The product may be isolated from the reaction mass by conventional processes including filtering and optional drying, which may be carried out at room temperature for the suitable durations to retain the crystalline polymorphic form characteristics. Crystalline Bortezomib Form-SB-I can be recovered by conventional processes, which are not limited to scrapping, breaking, triturating and if required conventional drying.

Crystalline Bortezomib Form-SB-I obtained according to present invention shall be dried under vacuum. However, water content corresponding to gets retained in the range between 3.5-5.5% w/w by Coulometry method.

In one embodiment of the present invention relates crystalline bortezomib is characterized by a powder X-ray diffraction pattern, which is characterized by peaks at about 6.00, 12.07, 13.25, 18.72, 18.88, 19.13, 21.46, 23.66, 24.07, 24.46 and 25.97±0.2° 2θ. The X-ray diffraction pattern substantially accordance with FIG. 1.

Figure 2:
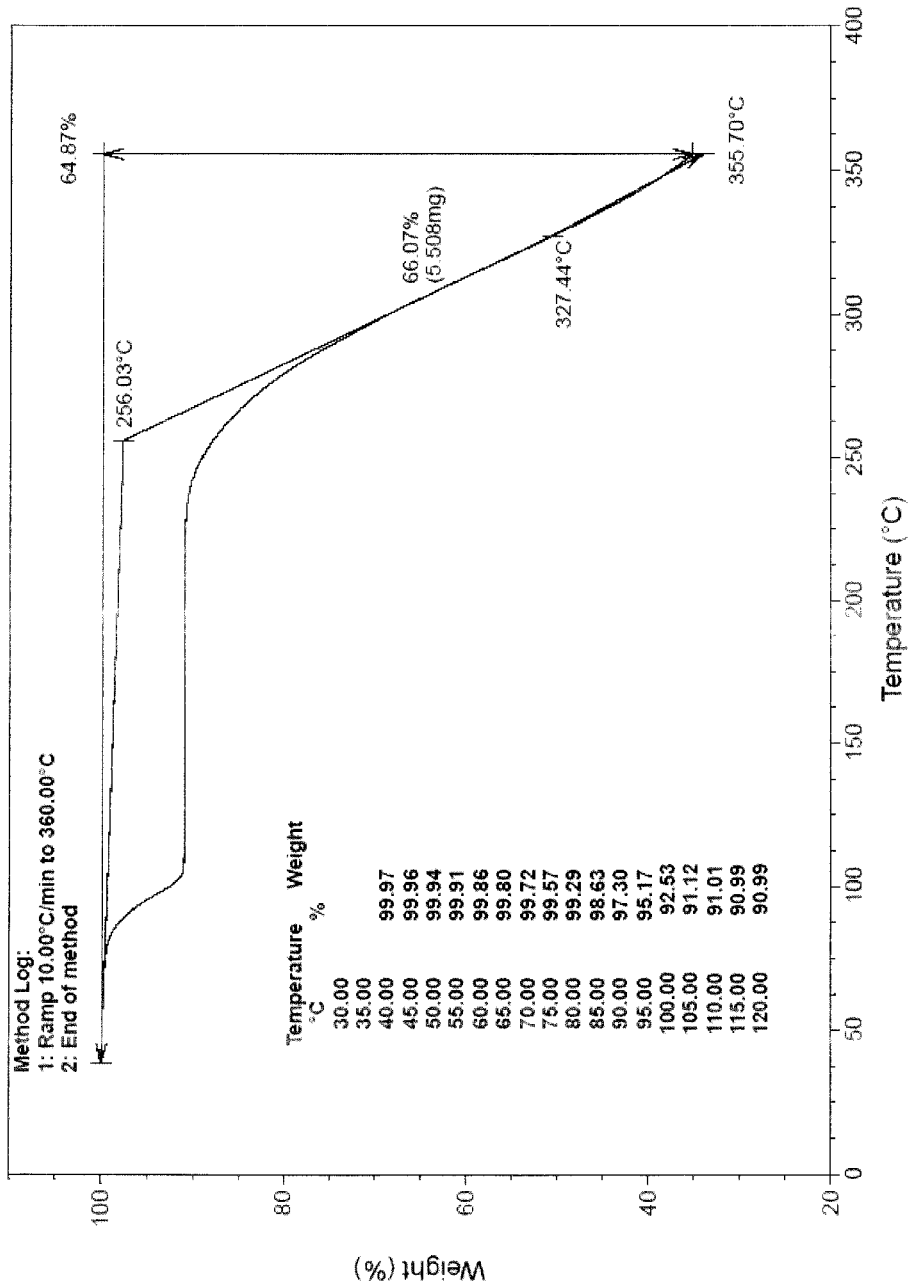
FIG. 2 is an example of DSC endotherm of crystalline Bortezomib Form-SB-I obtained according the present invention.

In one embodiment of the present invention relates crystalline bortezomib is characterized by DSC isotherm comprising an endothermic peak in between 101 to 103° C. The DSC isothermal pattern substantially according to Figure-2.

In another embodiment of the present invention relates crystalline bortezomib obtained by the process having moisture content of 3.5 to 5.5% w/w by coulometry method. However, upon heating the Bortezomib yields another water molecule for every molecule of Bortezomib, which trimerized to yield a Boroxine (Formula-II).

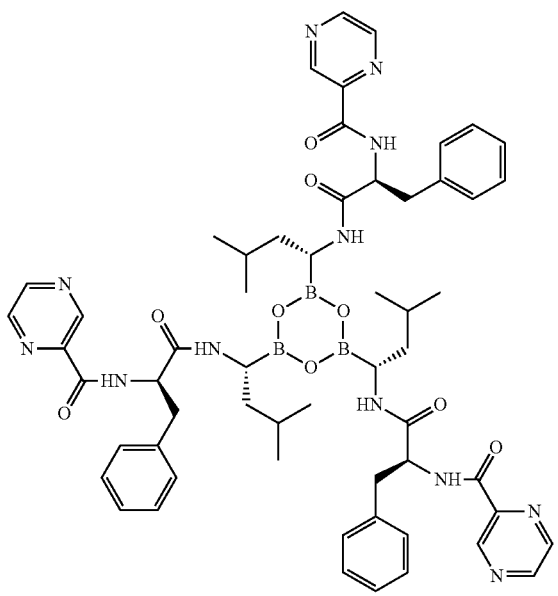

II

Figure 3:
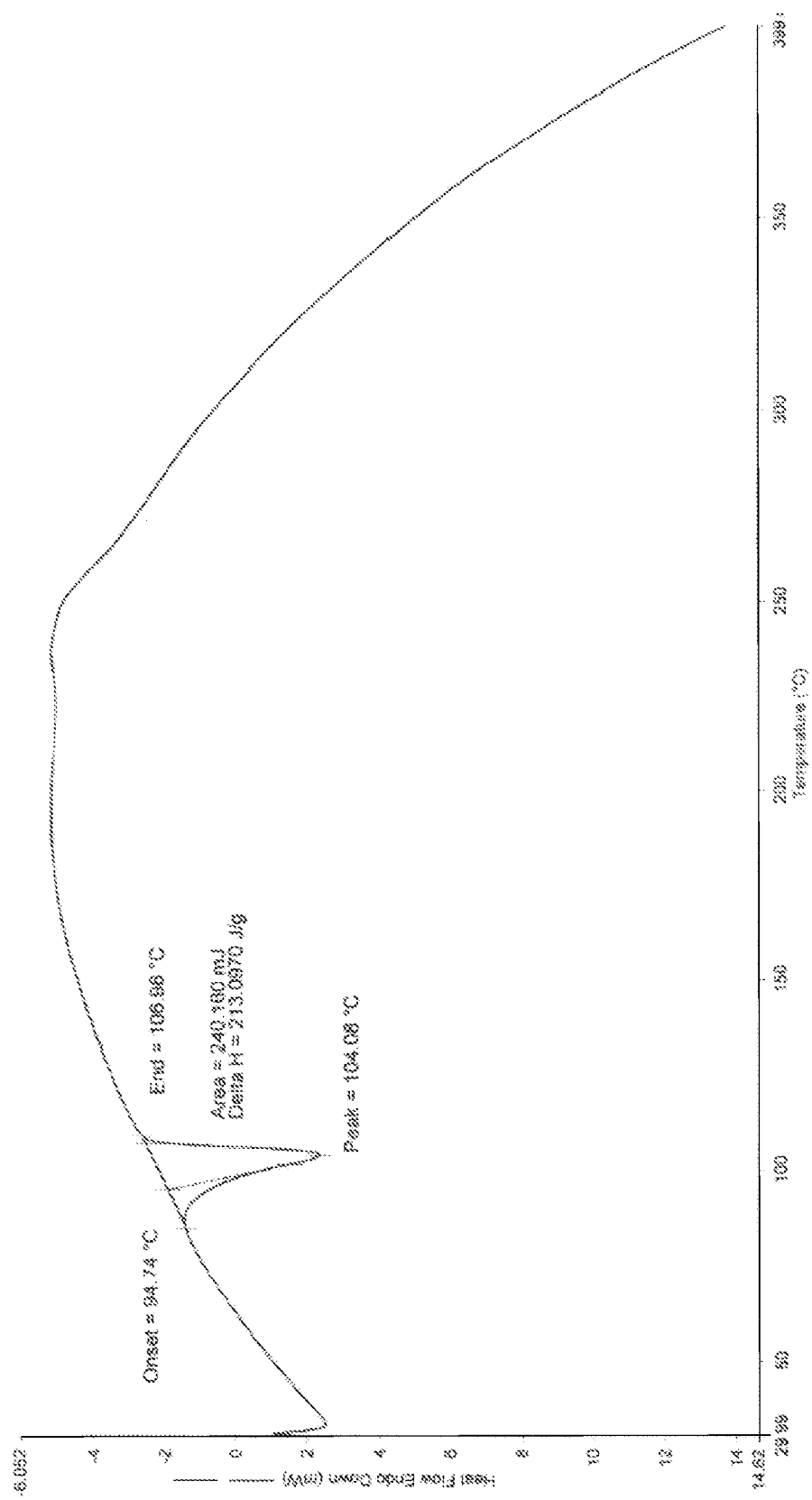
FIG. 3 is an example of TGA thermogram of crystalline Bortezomib Form-SB-I obtained according the present invention.

The formation of trimeric Bortezomib (Boroxine) had been confirmed by TGA, where in the water content based upon the Loss on drying method by thermo gravimetric analysis (TGA) method in the range between 8 to 10% w/w. The TGA pattern substantially according to FIG. 3.

The obtained crystalline Bortezomib obtained by the above process is stable and free of process related impurities.

In another embodiment, the process of the present invention advantageously provides bortezomib having low content of organic residual solvents and relatively low content of one or more organic volatile impurities.

The present invention provides highly pure crystalline bortezomib obtained had residual solvent content that is within the limits as per the International Conference on Harmonization of Technical Requirements for Registration of Pharmaceuticals for Human Use ("ICH") guidelines.

The Crystalline Form-SB-I of Bortezomib described herein is characterized by X-ray powder diffraction pattern (XRPD) and Thermal techniques such as differential scanning calorimetric (DSC) Analysis. The samples of Bortezomib Crystalline Form-SB-I were analyzed by XRPD on a Bruker AXS D8 Advance Diffractometer using X-ray source—Cu Ka radiation using the wavelength 1.5418 Å and DSC analysis were carried out on a Perkin Elmer Jade instrument. Illustrative examples of analytical data for the Crystalline Form-SB-I of Bortezomib obtained in the Examples are set forth in the FIGS. 1-3.

Crystalline Form-SB-I of Bortezomib of the present invention may have one or more advantageous and desirable properties compared to the known Bortezomib anhydrate or trimeric form, which are not limited to better stability, solubility and quality parameter (improved purity; >99.5%) leading to improved shelve life, storage and distribution.

In another embodiment, the present invention provides a pharmaceutical composition comprising crystalline bortezomib prepared by the process of the present invention and at least one pharmaceutically acceptable excipient.

In Bortezomib Crystalline Form-SB-I compositions, the active product is mixed with one or more pharmaceutically acceptable excipients. The drug substance can be formulated as lyophilized or ready to use compositions for injectable or solid/liquid compositions for oral administration including solutions, suspensions, syrups, elixirs and emulsions, containing solvents or vehicles such as water, sorbitol, glycerin, propylene glycol or liquid paraffin.

The compositions for parenteral administration can be solutions, suspensions, emulsions or aqueous or non-aqueous sterile solutions. As a solvent or vehicle, propylene glycol, polyethylene glycol, vegetable oils, especially olive oil, and injectable organic esters, e.g. ethyl oleate, may be employed. These compositions can contain adjuvants, especially wetting, emulsifying and dispersing agents. The sterilization may be carried out in several ways, e.g. Using a bacteriological filter, by incorporating sterilizing agents in the composition, by irradiation or by heating. They may be prepared in the form of sterile compositions, which can be dissolved at the time of use in sterile water or any other sterile injectable medium.

Pharmaceutically acceptable excipients used in the compositions comprising Crystalline Form-SB-I of Bortezomib of the present application include, but are not limited to diluents such as starch, pregelatinized starch, lactose, powdered cellulose, microcrystalline cellulose, dicalcium phosphate, tricalcium phosphate, mannitol, sorbitol, sugar and the like; binders such as acacia, guar gum, tragacanth, gelatin, pre-gelatinized starch and the like; disintegrates such as starch, sodium starch glycolate, pregelatinized starch, Croscarmellose sodium, colloidal silicon dioxide and the like; lubricants such as stearic acid, magnesium stearate, zinc stearate and the like; glidants such as colloidal silicon dioxide and the like; solubility or wetting enhancers such as anionic or cationic or neutral surfactants, waxes and the like. Other pharmaceutically acceptable excipients that are of use include but not limited to film formers, plasticizers, colorants, flavoring agents, sweeteners, viscosity enhancers, preservatives, antioxidants and the like.

Pharmaceutically acceptable excipients used in the compositions derived from Crystalline Form-SB-I of Bortezomib of the present application may also comprise to include the pharmaceutically acceptable carrier used for the preparation of solid dispersion, wherever utilized in the desired dosage form preparation.

The following examples illustrate the nature of the invention and are provided for illustrative purposes only and should not be construed to limit the scope of the invention.

EXAMPLES

Example-1: Preparation of Crystalline Bortezomib Form-SB-I

Bortezomib (30 gm) was added to mixture of ethyl acetate (855 ml) and water (45 ml) and stir for 10 minutes at 25° C. to 35° C. Stir the reaction mass for one hour at room temperature to get clear solution. Cool the reaction mass −20° C. to −25° C. and stir for 3 hours to obtain the solid. Filtered the solid and washed with water and dried for 17 hours at 30-35° C. under vacuum to yield pure Bortezomib.
Purity: 99.95%
Yield: 29 gm Example-2: Preparation of Crystalline Bortezomib Form-SB-I Bortezomib (30 gm) was added to mixture of methanol (90 ml) and water (810 ml) and stirred the reaction mass for 2-3 hour at room temperature. Filtered the obtained the solid and washed with water and dried for 20 hours at 30-35° C. under vacuum to yield pure Bortezomib.

Purity: 99.96%
Yield: 27 gm

Example-3: Preparation of Crystalline Bortezomib Form-SB-I

Bortezomib (30 gm) was added to mixture of ethanol (90 ml) and water (810 ml) and Stirred the reaction mass for 2-3 hour at room temperature. Filtered the obtained the solid and washed with water and dried for 20 hours at 30-35° C. under vacuum to yield pure Bortezomib.

Purity: 99.95%
Yield: 28 gm

We claim:

1. A crystalline form of bortezomib wherein the crystalline form is a crystalline form SB-I, characterized by peaks at 6.00, 12.07, 13.25, 18.72, 18.88, 19.13, 21.46, 23.66, 24.07, 24.46 and 25.97±0.2°; further characterized by DSC isotherm comprising at endothermic peak in between 101 to 103° C.

2. The crystalline form of bortezomib as in claim 1, wherein the crystalline form SB-I has water content based upon the Loss on Drying method by thermo gravimetric analysis (TGA) method in the range between 8 to 10% w/w.

* * * * *